H. N. & J. C. BILL.
Self Registering Scales.

No. 27,683.

Patented April 3, 1860.

Witnesses.

Inventors.

UNITED STATES PATENT OFFICE.

H. N. BILL AND J. C. BILL, OF WILLIMANTIC, CONNECTICUT.

SCALE.

Specification of Letters Patent No. 27,683, dated April 3, 1860.

*To all whom it may concern:*

Be it known that we, H. N. BILL and J. C. BILL, both of Willimantic, in the county of Windham and State of Connecticut, have invented a new and useful Improved Self-Registering Scale; and we do hereby declare that the following is a full, clear, and exact description thereof, reference being had to the accompanying drawings, forming a part of this specification, in which—

Figure 1:
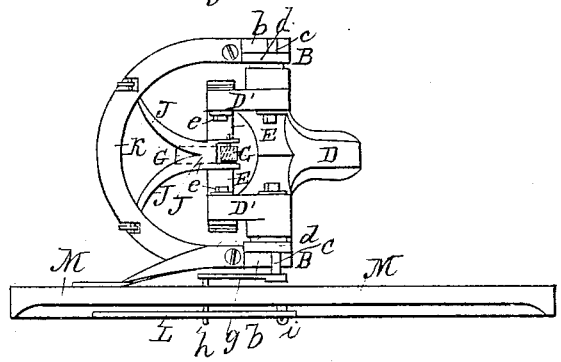
Figure 2:
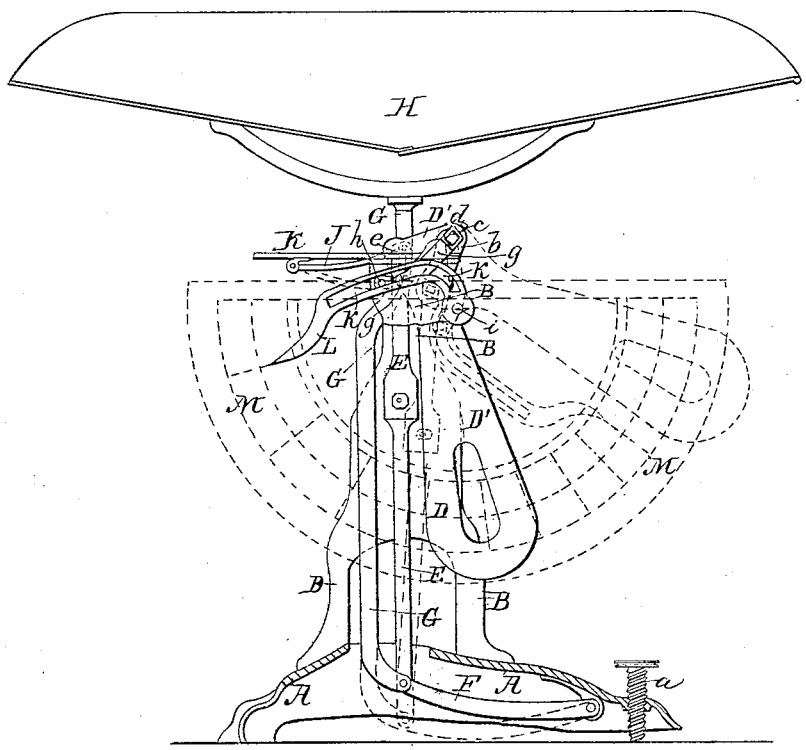

Figure 1 represents a top or plan view of our scale with the scale pan removed. Fig. 2 is a vertical sectional elevation showing the levers, and beams, and the several parts forming our improved scale in two extreme positions, and the dial hand in its relative position with the weighted or gravitating arm.

Similar letters of reference indicate corresponding parts in both figures.

This invention consists in the employment of a gravitating arm or lever arranged and supported on knife edges, and connected to the scale-beam by a vertical rod, which is hung and supported in a novel manner to the short arm of the weighted lever and base of the scales.

Our invention consists, firstly, in the employment of a gravitating lever in lieu of a spring, or movable weights that are, at present, in use, and in hanging this lever in a novel manner so as to be affected by the scale beam or a weight placed in the scale pan, and so register the exact weight of any article placed on the scale beam in a suitable manner, and as will be hereinafter described.

It consists, secondly, in a novel manner of hanging the index hand so as to compensate for the diminished arc the short arm of the gravitating lever makes, as the lever approaches a horizontal line.

To enable those skilled in the art to full understand our invention we will proceed to describe its construction and operation.

In the drawings, A represents a tripod base, one of the feet of which is a thumb screw $a$, designed to be used in leveling the apparatus. From this base proceed up a suitable height two standards B, B, (the front one is removed in Fig. 2, leaving only a portion of its top), on the top of each is secured a piece $b$, of steel in their upper surfaces or edges are obtuse triangular cavities formed, and in the angle of these cavities rest the knife edges $c$, which are the fulcrum of a gravitating lever D. These pivots or knife edges $c$, are held down on their bearings by ring plates $d$, $d$, which are secured under the steel pieces $b$, on standards B, B, and prevent the pivots and consequently the weighted lever from slipping out of its bearings or from getting detached from the standards in consequence of moving the scale about from place to place. The weighted lever D. which is thus hung from the standards B, B, and between the standards, has short right-angular arms D′, D′, projecting from its upper ends, which have two other knife edges $e$, $e$, projecting out from them, and depending from these is a bifurcated connecting rod E, leading down from each arm of the weighted lever D, to a vibrating arm F, one end of which is pivoted to the leg of the tripod carrying the set screw $a$, and the other to the connecting rod E, under the stand A. At this joint of the rod E, with the arm F, is connected the perpendicular rod G, on which the scale pan H, rests, this rod proceeds up, and near its top is bent over so that the weight put upon it will come directly over its junction with the vibrating arm F, and it is kept in a perpendicular position by a bifurcated swinging arm J, which is pivoted to it at a suitable point under the fingers for holding the pan, and at its opposite ends it is pivoted at two points to a horizontal semicircular plate K.

From this description it will be seen that a weight placed in the pan H, will act on the short arm of the gravitating lever D, through the medium of the vibrating arm F, and pendent rod E, and press down this short arm, which will raise the weighted portion of the same, and bring the point of suspension of the pendent rod nearer to the fulcrum of this weighted arm. Now in order that the short arc, which the short arm of the weighted lever describes,—it being only a quarter of a circle,—to raise the weighted lever to a horizontal position, may impart to the index hand L, a quarter arc, and thus obviate the objection to having the spaces on the index plate too rapidly diminish as the weighted arm reaches its maximum height, we employ an equalizing or compensating arrangement by which a semicircular arc will be described by the index hand while the short arm of the weighted lever describes only half that arc. This object is obtained as follows: M represents (in red lines) a semicircular plate, on the face of which the number of pounds and fractions of a pound are set off; this plate, M, is suitably secured to one side of the standard of the apparatus, with its center, or rather the center from which the semicircle is described placed below, and a little to one side of the axis of motion of the weighted lever D. An arm *g*, having a pin *h*, on one end projecting out at right angles to the arm, is attached to a projecting portion of the knife-edged bearing, as shown by Figs. 1 and 2, this arm is slightly bent, as represented in Fig. 2, and its pin *h*, passes through a peculiarly curved slot *k*, in the index hand L, shown by Fig. 2. This index hand is pivoted to the center of the index plate M, at *i*, and its vibration is governed by the slot which is traversed by the pin *h*, as the arm *g*, is depressed. The peculiarity of the slot in this index hand L, is that it describes a volute, or the curve approaches the axis of motion of the hand as it leaves a straight line, the pin *h*, now traversing in such a slot, will cause the index hand to describe a much greater arc than that described by the pin *h*, on the arm *g*, and by this means the scale on the index plate M, may be made so that it can be read off without any difficulty.

The weighted lever D, may be bent in a right or any other angle, and the arms are not restricted to any definite relative proportion; the capacity of the instrument is increased in the exact proportion as the relative length of the short arm is diminished; and there are two ways of increasing the capacity of the machine, one way by changing the relative lengths of the arms, and the other, by adding to the weight of the long arm.

Having thus described our invention, what we claim, and desire to secure by Letters Patent, is:—

1. The combination of the weighted lever D, D', dependent rod E, vibrating rod F, perpendicular scale rod G, and swinging arms J, arranged and combined substantially as described and represented.

2. We claim the slotted index hand L, hung on an isolated center from the fulcrum of the weighted lever D, in the manner and for the purposes herein set forth.

H. N. BILL.
J. C. BILL.

Witnesses:
J. R. ARNOLD,
W. W. ARNOLD.